United States Patent [19]
Guilbault et al.

[11] 3,857,777

[45] Dec. 31, 1974

[54] ION EXCHANGE MEMBRANE FOR MEASURING ORTHOPHOSPHATE

[75] Inventors: George G. Guilbault, New Orleans, La.; Frank R. Shu, Hsinchu, China /Taiwan; Henning Von Storp, Heidesheim, Germany

[73] Assignee: The United States of America as represented by the Administrator of the U.S. Environmental Protection Agency, Washington, D.C.

[22] Filed: Aug. 10, 1973

[21] Appl. No.: 387,569

[52] U.S. Cl. ............ 204/296, 204/1 T, 204/195 M, 204/195 P, 260/68, 264/430
[51] Int. Cl. ............................................. B01k 3/10
[58] Field of Search ........... 260/68, 430; 204/195 P, 204/195 M, 296

[56] References Cited
UNITED STATES PATENTS

| | | |
|---|---|---|
| 2,636,851 | 4/1953 | Juda et al. .................... 204/296 X |
| 3,297,595 | 1/1967 | Mindick et al. ................ 204/296 X |
| 3,719,575 | 3/1973 | Niedrach et al. ............... 204/195 P |
| 3,799,743 | 3/1974 | Alexander et al. ............ 204/296 X |
| 3,809,638 | 5/1974 | Hegashiyama et al. ........ 204/195 M |

Primary Examiner—F. C. Edmundson

[57] ABSTRACT

A new ion exchange membrane with a mixed complex employing a ligand with a thiourea functional group, is used to give an electrode specificity in monitoring the concentration of a specific solute species. Specificity is achieved by measuring changes in another ligand's exchanging rates, which varies preferentially with the concentration of the solute species being studied. An electrode using a new combination, a silver polythioureaglutaraldehyde phosphate complex mixed with silver sulfide has been built and used to attain electrode specificity in measuring orthophosphate ions.

4 Claims, 2 Drawing Figures

ION EXCHANGE MEMBRANE FOR MEASURING ORTHOPHOSPHATE

BACKGROUND OF THE INVENTION

Many solute species such as the dibasic phosphate ion when in solution with other common ions such as sulfate, nitrate, chlorate, and acetate, can not have their concentration monitored using any previously known electrode. The reason for this is that only a limited number of ion selective electrodes are available and such electrodes are specific for only a limited number of ions.

This problem is particularly acute in the case of biological fluids. Biological fluids contain many of the common ions previously mentioned in addition to a great many other solute species. The other solute species are of great experimental and medical importance; these two fields require a means of monitoring the concentration of a specific solute species in a biological fluid in order to trace and measure biological processes.

The prior art teaches the use of other techniques to attain electrode specificity in monitoring various ion solute species, but none teach the use of the thiourea functional group as part of a mixed complex to attain electrode specificity.

SUMMARY OF THE INVENTION

We have found an ion exchange membrane for use with an electrode, that is capable of discriminating between various solute species, when made with the proper mixed complex which includes a ligand with a thiourea functional group. This electrode operates on the principle that the exchanging rates of a ligand of the mixed complex, which is a measurable phenomena, will vary with the change in concentration of a specific solute species.

An example of such an electrode has been constructed and operated using a silver polythiourea-glutaraldehyde phosphate complex to detect dibasic phosphate ions.

Hence, it is an object of our invention to provide a membrane for use in detecting the concentration of a specific ion even while in a solution with more common ions such as sulfate, nitrate, chlorate, and acetate.

It is a further object of our invention to provide a membrane for use with an electrode so that the concentration of a specific ion in a biological solution can be monitored despite the masking effect of other biological solute species in the fluid sample.

A specific object of our invention is to provide a membrane for use with an electrode so that orthophosphate concentration can be monitored despite the presence of other more common ions and biological solute species.

Figure 1:
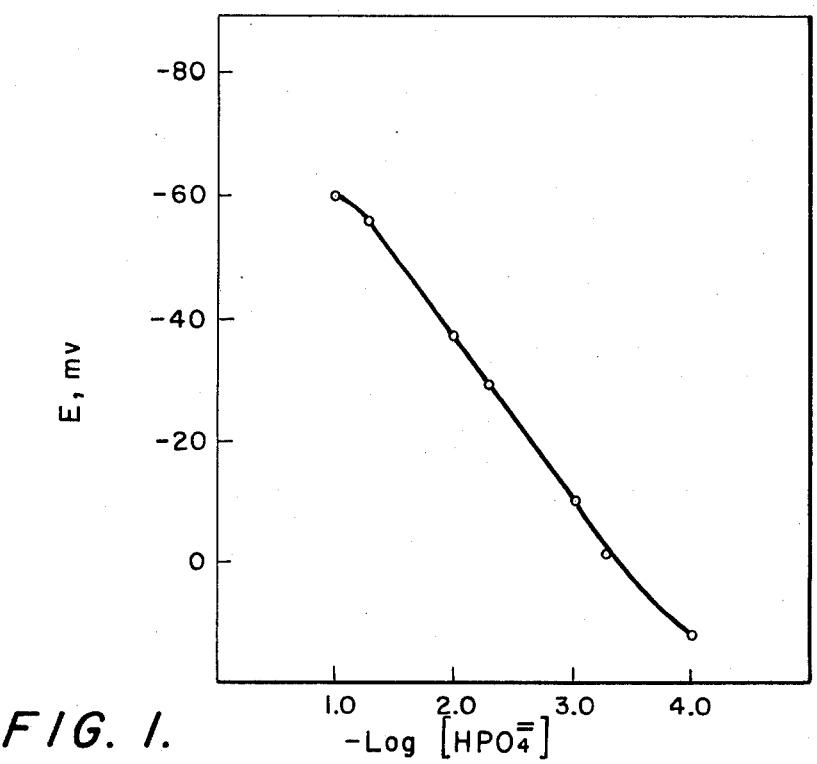
FIG. 1 is a graph of the response of the phosphate ionselective membrane electrode to dibasic phosphate. All measurements were made at 25°C and pH 6.0 in the presence of 0.01 M acetate buffer.

[phosphate] = 0.01 M ; 2 [sulfate]= 0.01 M

DESCRIPTION OF THE PREFERRED EMBODIMENTS

A mixed complex, $M(L_1)(L_2)$, may undergo the following reaction:

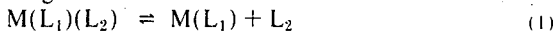

where M represents the metal ion; $L_1$ and $L_2$ are the ligands. In this reaction, it is known that $L_1$ has kinetic effects on the exchanging rates of $L_2$. Thus, it is possible to enhance the exchanging rates of reaction (1) by properly choosing M and $L_1$.

For measuring the concentration of a given solute species (S), the criteria for selection of a proper M and $L_1$ are:

1. the presence of S in solution causes a predictable and measurable affect on the exchanging rates of $L_2$ which varies with the concentration of S in the solution;
2. the modification of the exchanging rates of $L_2$ caused by S is distinguishable from any change in the exchanging rates caused by other solute species present in the solution to be tested.

The measurement of the concentration of S is accomplished by measuring the deviation of the exchanging rate of $L_2$ from a predetermined normal value. The measurement of the normal and deviation values of the exchanging rates can be measured by an adaptation of previously known electrode techniques.

Studies indicate that the dissociation of a phosphate ion from insoluble metal phosphates such as $FePO_4$ is an extremely slow process. Since fast exchanging rates are essential in the course of developing a phosphate electrode, the use of mixed complexes of the type of $M(L_1)(H_xPO_4)$ appeared to be the most promising approach for the development of a phosphate electrode. Instead of exchanging phosphate ions, insoluble metal phosphates may act like cation exchangers for $H^+$, $Na^+$ or other cations present in solution.

Following this new approach, we have discovered that the reactions:

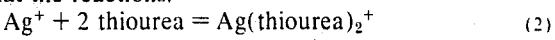

soluble

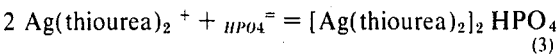

are suitable for the purpose of measuring dibasic phosphate ion concentration. A biphosphate measuring electrode was fabricated which employed reactions (2) and (3) and overcame the difficulty inherent with the salt of the silver polythioureaglutaraldehyde phosphate complex.

The phosphate salt of silver thiourea complex is hygroscopic and can cause a serious problem because of its diffusion potential when it is incorporated in an $Ag_2S$ matrix for potentiometric measurements. In an attempt to overcome this difficulty, the thiourea molecules are modified by polymerizing thiourea with glutaraldehyde. Although the structural details of polythioureaglutaraldehyde (PTG) is not known, it appears that the thiourea functional group of the polymer can undergo the same complexation reaction with silver ion as expressed in equation (2). The silver complex of PTG is soluble in water but forms an insoluble salt with dibasic phosphate. The precipitate and the electrode employing the precipitate were prepared as follows:

Preparation of Phosphate Complex Salt

A solution containing 7.4 gm of thiourea was added to 21 gm of 50 percent glutaraldehyde solution. The reactants were stirred and heated in an oil bath for a period of 2 hours. The resulting was an aqueous solution of polythioureaglutaraldehyde (PTG). By introducing 230 ml of 0.2 M silver nitrate into this PTG solution, one would obtain a solution of the silver complex of PTG. This complex was precipitated down from the solution by adding a sufficient amount of sodium dibasic phosphate. The precipitate was washed and dried under a vacuum.

The compound, silver polythioureaglutaraldehyde phosphate complex, prepared in this manner is named PCPX-1.

Preparation of Phosphate Electrode 110 mg of PCPX-1 was thoroughly ground with 550 mg of silver sulfide. The mixture was pressed into a pellet under a pressure of 15 tons. The membrane was then glued on a pyrex tubing with silicon rubber sealant.

The internal filling solution was a phosphate buffer solution (0.01 M, pH 6.7) saturated with silver ion. A standard Saturated Calomel Electrode (SCE) served as the internal reference electrode.

Procedure

The phosphate electrode was soaked in 0.01 M, pH 6.0 phosphate buffer overnight before use. The potentiometric response of the phosphate electrode was measured against a double junction SCE.

All chemicals used were reagent grade. Doubly distilled water was used to prepare all solutions. To prepare phosphate solutions for potentiometric measurements, acetate buffer (0.01 M, pH 6.0) was employed to control pH as well as ionic strength. For the study of pH effects, both phosphate and sulfate solutions were made by using pure $NaH_2PO_4$ and $Na_2SO_4$ respectively without acetate buffer.

Results and Discussion

The potential value of the phosphate electrode is plotted versus the concentration of $HPO_4^=$ in FIG. 1. Linearity is observed in most of the calibration curve with a near Nernstian slope of 27 mv per decade. In the presence of 0.01 M acetate, the electrode has a useful concentration range from $10^{-4}$ to $10^{-1}$ M. Without any background electrolyte, the operable lower concentration limit may be extended to $10^{-5}$ M of $HPO_4^=$.

The ratio of $Ag_2S$ to PCPX-1 plays an important role in the performance of the present electrode. A preferred weight ratio of 10:2 for $Ag_2S$ to PCPX-1 was used. When the membrane is new the electrode reaches a stable potential value in less than 2 minutes. The reproducibility is within 2 mv. After the electrode has been used for three days, the potentiometric response of the electrode becomes slower presumably due to the consumption of the interstitial silver ion of the membrane. A noticeable loss in sensitivity is also observed. Decreasing the ratio of $Ag_2S$ to PCPX-1 to 10:1 improves the reproducibility and the usable life of the electrode. However, the sensitivity of the electrode is reduced to 22 mv/dec. On the other hand, a 10:3 ratio membrane electrode gives a better sensitivity (30 mv/dec.) and a faster electrode response. However, the electrode drifts slowly and has a relatively poor reproducibility of 3 mv. Thus, the ratio of 10:2 appears to be a compromise, and for the present, a preferred choice.

The anion selectivity of the phosphate electrode is in the order $HPO_4^=$, $Cl^- > SO_4^= >> NO_3^- > ClO_4^-$, $OAc^-$. Based on our preliminary data, the selectivity ratio of $HPO_4^=$ over $SO_4$ is greater than 10. For $NO_3^-$, $ClO_4^-$ and $OAc^-$, the selectivity ratios are in the range of $10^2$ to $10^3$. The chloride ion could apparently compete with the thiourea functional group of the ligand molecule for silver ion, thereby resulting in a decrease in the potential of the electrode.

Figure 2:
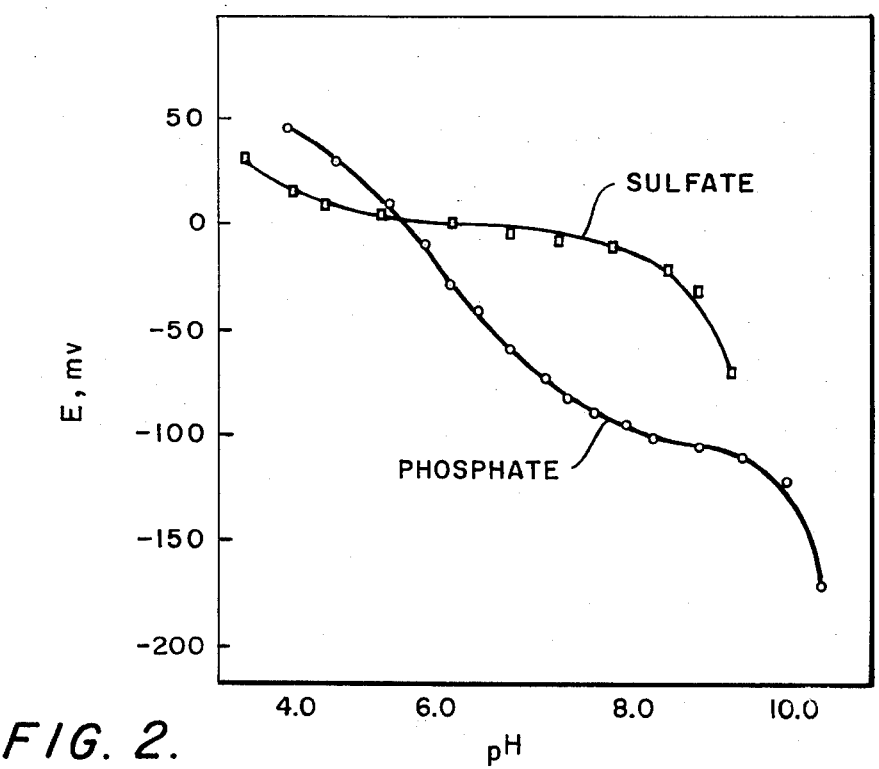
FIG. 2 is a graph of the potential response of the phosphate electrode at various pH's, where.

The pH effect on the electrode response is shown in FIG. 2. Comparing the potential of a 0.01 M sulfate solution with that of a 0.01 M phosphate solution at various pH values, it is noticed that the effect of pH on the electrode response is perhaps negligible in the pH region of 6 to 9. For phosphate ion, it appears that the potential change which follows the variation of pH of the solution merely reflects the variation of the mole fraction of $HPO_4^=$ in the solution. For sulfate ion, the small decrease in potential as pH is increased is probably due to the formation of more $HPO_4^=$ at the membrane surface. The increase of the concentration of $HPO_4^=$ at the electrode surface would suppress the free silver ion and therefore result in a decrease in potential. At pH values above 9 a drastic potential change is observed for both sulfate and phosphate ions. Presumably,, both $PO_4^=$ and $OH^-$ could affect the equilibrium of reaction 2 in highly basic solutions. In order to achieve better sensitivity for the measurement of $HPO_4^=$ in solution, the present electrode is preferably used between pH 6 to 9. However, it is difficult to find a convenient buffer that does not interfere with the potentiometric measurement of $HPO_4^=$ in this pH region. Consequently, the phosphate solutions prepared for the current study are buffered with acetate at pH 6.0.

While the invention has been disclosed by way of the foregoing particularly preferred embodiments, various modifications thereto will be evident to those skilled in the art and thus such embodiments are intended in a descriptive and not in a limiting sense. The spirit and scope of the invention will be evident from the following claims.

What is claimed is:

1. An ion exchange membrane to segregate a reference electrode from a fluid sample, which when both the segregated reference electrode and a measuring electrode are suspended in a fluid sample that contains a specific ion from a class of large molecule anions, results in a potentiometric value for said measuring electrode and fluid sample when measured against said reference electrode, and wherein the potentiometric value varies predominantly with the variation in concentration of said specific ion rather than with the variation of concentration of other solute species, wherein said membrane comprises, a thiourea-aldehyde polymer, silver ion and a phosphate ion.

2. The ion exchange membrane as defined in claim 1, wherein the thiourea is polymerized with glutaraldehyde.

3. The ion exchange membrane as defined in claim 1, wherein the ligand that is a large molecule anion, is the dibasic phosphate ion.

4. An ion exchange membrane to segregate a reference electrode from a fluid sample, which when both the segregated reference electrode and a measuring electrode are suspended in a fluid sample that contains a specific ion from a class of large molecule anions, results in a potentiometric value for said measuring electrode and fluid sample when measured against said reference electrode, and wherein the potentiometric value varies predominantly with the variation in concentration of said specific ion rather than with the variation of concentration of other solute species, wherein said membrane comprises, a mixed complex, and said mixed complex comprises, a ligand made by polymerizing thiourea with glutaraldehyde, and another ligand that is a dibasic phosphate ion, and a silver ion.

* * * * *